United States Patent
Ayars et al.

(10) Patent No.: US 9,710,620 B2
(45) Date of Patent: *Jul. 18, 2017

(54) DIGITAL RIGHTS MANAGEMENT HANDLER AND RELATED METHODS

(71) Applicant: Intel Corporation, Santa Clara, CA (US)

(72) Inventors: Jeffrey M. Ayars, North Bend, WA (US); Bradley D. Hefta-Gaub, Seattle, WA (US); Daniel Sheeran, Medina, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,666

(22) Filed: Mar. 22, 2016

(65) Prior Publication Data

US 2016/0203303 A1 Jul. 14, 2016

Related U.S. Application Data

(63) Continuation of application No. 14/267,704, filed on May 1, 2014, now Pat. No. 9,323,905, which is a
(Continued)

(51) Int. Cl.
*H04L 29/06* (2006.01)
*G06F 21/10* (2013.01)
(Continued)

(52) U.S. Cl.
CPC ............. *G06F 21/10* (2013.01); *G06F 21/16* (2013.01); *H04L 63/10* (2013.01); *H04N 21/234336* (2013.01); *H04N 21/2541* (2013.01)

(58) Field of Classification Search
CPC ...................................................... G06F 21/10
(Continued)

(56) References Cited

U.S. PATENT DOCUMENTS 4,919,545 A 4/1990 Yu
5,023,907 A 6/1991 Johnson et al.
(Continued)

FOREIGN PATENT DOCUMENTS

EP 0 367 700 A2 5/1990
EP 0 567 800 A1 11/1993
(Continued)

OTHER PUBLICATIONS

Non-Final Office Action Received for the U.S. Appl. No. 10/660,302, mailed on Jun. 4, 2007, 18 pages.
(Continued)

*Primary Examiner* — Longbit Chai
(74) *Attorney, Agent, or Firm* — Christopher K. Gagne

(57) ABSTRACT

A system and method of providing universal digital rights management system protection is described. One feature of the invention concerns systems and methods for repackaging and securing data packaged under any file format type, compression technique, or digital rights management system. Another feature of the invention is directed to systems and methods for securing data by providing scalability through the use of modular data manipulation software objects.

20 Claims, 5 Drawing Sheets

Related U.S. Application Data continuation of application No. 12/725,298, filed on Mar. 16, 2010, now Pat. No. 8,751,798, which is a continuation of application No. 10/660,302, filed on Sep. 10, 2003, now Pat. No. 7,681,035.

(51) Int. Cl.
    *H04N 21/2343*     (2011.01)
    *H04N 21/254*     (2011.01)
    *G06F 21/16*     (2013.01)

(58) Field of Classification Search
    USPC .......................................................... 713/165
    See application file for complete search history.

(56) References Cited

U.S. PATENT DOCUMENTS

| | | |
|---|---|---|
| 5,103,476 A | 4/1992 | Waite et al. |
| 5,222,134 A | 6/1993 | Waite et al. |
| 5,235,642 A | 8/1993 | Wobber et al. |
| 5,319,705 A | 6/1994 | Halter et al. |
| 5,321,841 A | 6/1994 | East et al. |
| 5,375,240 A | 12/1994 | Grundy |
| 5,400,403 A | 3/1995 | Fahn et al. |
| 5,530,235 A | 6/1996 | Stefik et al. |
| 5,629,980 A | 5/1997 | Stefik et al. |
| 5,634,012 A | 5/1997 | Stefik et al. |
| 5,638,443 A | 6/1997 | Stefik et al. |
| 5,844,575 A | 12/1998 | Reid |
| 5,845,281 A | 12/1998 | Benson et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,949,876 A | 9/1999 | Ginter et al. |
| 5,982,891 A | 11/1999 | Ginter et al. |
| 6,185,683 B1 | 2/2001 | Ginter et al. |
| 6,237,786 B1 | 5/2001 | Ginter et al. |
| 6,253,193 B1 | 6/2001 | Ginter et al. |
| 6,363,488 B1 | 3/2002 | Ginter et al. |
| 6,389,402 B1 | 5/2002 | Ginter et al. |
| 6,427,140 B1 | 7/2002 | Ginter et al. |
| 6,463,445 B1 | 10/2002 | Suzuki et al. |
| 6,523,022 B1 * | 2/2003 | Hobbs ............... G06F 17/30637 |
| 6,640,304 B2 | 10/2003 | Ginter et al. |
| 6,658,568 B1 | 12/2003 | Ginter et al. |
| 7,120,250 B2 | 10/2006 | Candelore |
| 7,281,273 B2 | 10/2007 | Strom et al. |
| 7,380,120 B1 | 5/2008 | Garcia |
| 7,681,035 B1 | 3/2010 | Ayars et al. |
| 8,751,798 B2 | 6/2014 | Ayars et al. |
| 9,323,905 B2 | 4/2016 | Ayars |
| 2003/0046274 A1 | 3/2003 | Erickson et al. |
| 2003/0126086 A1 * | 7/2003 | Safadi ..................... G06F 21/10 705/51 |
| 2003/0235341 A1 * | 12/2003 | Gokturk ............. G06K 9/00228 382/243 |
| 2004/0230806 A1 | 11/2004 | Lisanke |
| 2004/0237067 A1 | 11/2004 | Sun et al. |
| 2006/0062426 A1 | 3/2006 | Levy et al. |

FOREIGN PATENT DOCUMENTS

| | | |
|---|---|---|
| EP | 0 653 695 A2 | 5/1995 |
| WO | 96/27155 A2 | 9/1996 |

OTHER PUBLICATIONS

Response to Non-Final Office Action received for U.S. Appl. No. 10/660,302, filed on Sep. 4, 2007, 24 pages.
Non-Final Office Action Received for the U.S. Appl. No. 10/660,302, mailed on Dec. 27, 2007, 13 pages.
Response to Non-Final Office Action received for U.S. Appl. No. 10/660,302, filed on Apr. 1, 2008, 18 pages.
Non-Final Office Action Received for the U.S. Appl. No. 10/660,302, mailed on Aug. 6, 2008, 14 pages.
Response to Non-Final Office Action received for U.S. Appl. No. 10/660,302, filed on Dec. 8, 2008, 25 pages.
Final Office Action Received for the U.S. Appl. No. 10/660,302, mailed on Jan. 12, 2009, 15 pages.
Response to Final Office Action received for U.S. Appl. No. 10/660,302, filed on Mar. 12, 2009, 22 pages.
Non-Final Office Action received for the U.S. Appl. No. 10/660,302, mailed on Apr. 30, 2009, 12 pages.
Response to Non-Final Office Action received for U.S. Appl. No. 10/660,302, filed on Jul. 30, 2009, 20 pages.
Notice of Allowance received for U.S. Appl. No. 10/660,302, mailed on Nov. 2, 2009, 19 pages.
Non-Final Office Action received for U.S. Appl. No. 12/725,298, mailed on Jul. 26, 2011, 6 pages.
Response to Non-Final Office Action received for U.S. Appl. No. 12/725,298, filed on Jan. 13, 2012, 12 pages.
Final Office Action received for U.S. Appl. No. 12/725,298, mailed on Jan. 26, 2012, 13 pages.
Response to Final Office Action received for U.S. Appl. No. 12/725,298, filed on May 10, 2012, 20 pages.
Advisory Action received for U.S. Appl. No. 12/725,298, mailed on Jun. 7, 2012, 3 pages.
Response to Advisory Action received for U.S. Appl. No. 12/725,298, filed on Jul. 23, 2012, 20 pages.
Non-Final Office Action received for U.S. Appl. No. 12/725,298, mailed on Sep. 19, 2013, 10 pages.
Response to Non-Final Office Action received for U.S. Appl. No. 12/725,298, filed on Dec. 19, 2013, 20 pages.
Notice of Allowance received for U.S. Appl. No. 12/725,298, mailed on Jan. 30, 2014, 13 pages.
Notice of Allowance in U.S. Appl. No. 14/267,704, dated Dec. 30, 2015 (11 pages).
Amendment After Final Rejection in U.S. Appl. No. 14/267,704, dated Nov. 18, 2015 (12 pages).
Amendment After Final Rejection in U.S. Appl. No. 14/267,704, dated Nov. 17, 2015 (11 pages).
Office Action in U.S. Appl. No. 14/267,704, dated Sep. 28, 2015 (10 pages).
Amendment in U.S. Appl. No. 14/267,704, dated Sep. 9, 2015 (9 pages).
Office Action in U.S. Appl. No. 14/267,704, dated Jul. 20, 2015 (18 pages).

\* cited by examiner

DIGITAL RIGHTS MANAGEMENT HANDLER AND RELATED METHODS

CROSS-REFERENCE TO RELATED APPLICATIONS

This application is a continuation of prior U.S. patent application Ser. No. 12/725,298 filed Mar. 16, 2010, which is a continuation of prior U.S. patent application Ser. No. 10/660,302 filed Sep. 10, 2003, now U.S. Pat. No. 7,681,035. Each of these prior applications is hereby incorporated herein by reference in its entirety and for all purposes.

BACKGROUND OF THE INVENTION

Field of the Invention

The invention generally relates to systems and methods for controlling the access to and the distribution of digital data. More specifically, the invention relates to systems and methods that provide interoperability across multiple devices and techniques that manage authorization for accessing or distributing digital content.

Description of the Related Technology

The distribution of digital content ("content") continues to expand as digital content providers ("providers") utilize the Internet as a vehicle for distributing content. Content may be in the form of, for example, video, audio, text, or any combination thereof, which may be accessed or distributed as a single file or as a data stream. As used here, the term "presentation" refers to digital content packaged as audio, video, text, or any combination thereof, for consumption by digital content consumers ("consumers"). For example, a presentation can be digital content in the form of a musical piece, a picture or image, a movie, a magazine article, an excerpt from a text, etc. As used here, the terms "digital content," "content," "data," "presentation," and "multi-media presentation" are synonymous unless the use of any one of these terms is otherwise explicitly qualified.

To facilitate the distribution of content, providers often rely on a digital content distributor ("distributor") to host and distribute the content. Typically, the distributor advertises the content and provides access to it over the Internet. Distributors allow providers to focus on producing content, rather than spend their resources handling the technical issues of distributing the content online. Distributors increase consumers' access to content because consumers can obtain varied content from multiple providers merely by accessing a single node on a network, e.g., a Web site.

Additionally, distributors can improve content security for providers that desire to control the access or distribution of their content. Content security refers to techniques for ensuring that electronic data stored in computing devices or transmitted between or among nodes of a network cannot be read, copied, displayed, altered, etc., without proper authorization. Most security measures involve data encryption and passwords. A password is a secret word, key, or phrase that must be used to access content or a system that handles content.

Typically providers desire to control consumer access to presentations. The term "access" refers to a privilege to use presentations in some manner. The term "access control" refers to mechanisms and policies that restrict access to computing resources such as computing devices, digital content, etc. For example, the provider might grant to a consumer read-only access to presentations, meaning that the consumer can view or read the presentation but cannot modify, copy, or delete it.

It is common for providers to control access to presentations by using, for example, digital rights management ("DRM") systems. As used here a DRM system refers to devices or techniques for controlling the access and/or the distribution of data, e.g., data circulated via the Internet. Typically, a DRM system protects presentations by either encrypting the data so that only authorized consumers can access it or by marking the presentation with a digital watermark or similar method to prevent free distribution of the presentation. Additionally, usually DRM technologies impose constraints on the use of presentations that correspond to the terms of the agreement between provider, distributor, and consumer.

Because a distributor can centralize the purchasing and/or licensing of content, the distributor simplifies and makes more convenient the use of DRM systems. However, different providers may package their content using different file format types, compression techniques, or DRM systems, and consequently, the differently packaged content may require separate and distinct software or hardware platforms for use. When the distributor provides content as-is directly to a consumer, the consumer may have to install and use different platforms, thereby creating inconvenience for the consumer. Moreover, the use of different DRM systems can prevent consumers from easily purchasing access to content, and can thwart the distributor's effort to offer a consistent consumer interface for content delivery.

What is needed in the industry is a flexible digital rights management handler that allows the distributor to accept content packaged in a variety of file format types compression techniques, and DRM systems. The handler can be configured to allow the distributor to provide a consistent consumer interface to consumers regardless of the original packaging of the content.

BRIEF DESCRIPTION OF THE DRAWINGS

A digital content protection handling system and related methods will now be described with reference to the following drawings.

DETAILED DESCRIPTION OF CERTAIN INVENTIVE EMBODIMENTS

The aspects, features and advantages of the invention will be better understood by referring to the following detailed description in conjunction with the accompanying drawings. These drawings and the associated description are provided to illustrate embodiments of the invention, and not to limit the scope of the invention.

The systems and methods described below provide a DRM system handler. In one embodiment, the invention concerns a system and related methods that provide a reconfigurable software module containing dynamically-installable parsing software objects that allow the reading and protection of data, which data uses a particular file format type or compression technique, with a selected one of a set of DRM systems. In another embodiment, the system and methods employ dynamically-installable writing software objects that allow modification of data packaged according to a file format type or compression technique to employ a different format type or compression technique. In addition, in one instance the system and methods employ dynamically-installable DRM system software objects that allow modification of content using any DRM system. In yet another embodiment, the invention concerns a system and corresponding methods that allow, through the use of libraries of dynamically-installable objects, addition of new compression techniques, file format types, and DRM systems with a minimum of system reconfiguration. As described below, in one instance computer software performs these tasks by receiving data associated with, for example, a multi-media presentation (i.e., digital content) and modifying and manipulating the data to create an output file containing the same content but with a selected file format, compression technique, and/or DRM system that can differ from the file format, compression technique, and/or DRM system associated with the received data.

Figure 1:
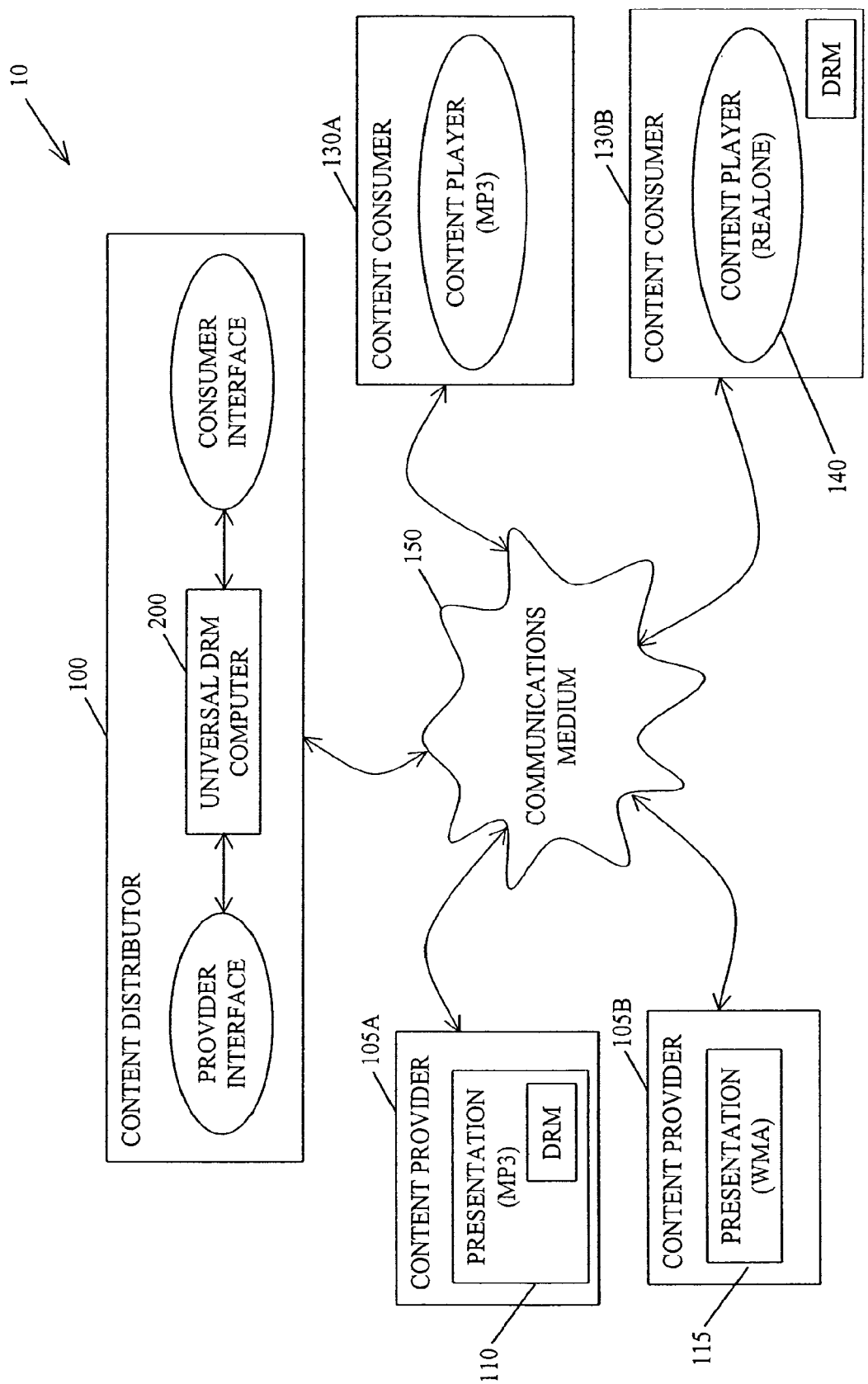
FIG. 1 is a block diagram illustrating an exemplary system, according to one embodiment of the invention, for handling data in a content distribution system that employs multiple DRM systems.

FIG. 1 is a block diagram illustrating an exemplary system 10 for distributing content using a DRM system handler in accordance with one embodiment of the invention. The system 10 can include multiple providers 105A and 105B, multiple consumers 130A and 130B, and a distributor 100, all of which can be configured to communicate with each other, singly or in combination, via a communications medium 150. In one embodiment, the providers 105A and 105B can be computing devices that store presentations 110 and 115. Computing devices include desktop, server, portable, hand-held, set-top, or any other desired type of computer configuration. Of course, in other embodiments, fewer or greater numbers of providers 105A and 105B, consumers 130A-B, and distributors 100 can be included.

The communications medium 150 can be any type of electronically connected group of computing devices including, for instance, the following networks: Internet, Intranet, Local Area Networks, or Wide Area Networks. In addition, the connectivity to the communications medium 150 may be, for example, remote modem, Ethernet, Token Ring, Wireless Ethernet, Fiber Distributed Datalink Interface, or Asynchronous Transfer Mode. The communications medium 150 can include network variations such as the public Internet, a private network within the Internet, a secure network within the Internet, a private network, a public network, a value-added network, an Intranet, etc.

The providers 105A-B can store presentations 110 and 115. In this example, presentation 110 is an audio file in MPEG Audio Layer 3 ("MP3") format type, and presentation 115 is a Windows Media Audio ("WMA") format type; however, in other embodiments the providers 105A-B can store various combinations of audio, video, and other multimedia presentations. As shown, in one embodiment, the presentation 110 can include an MP3 presentation packaged according to a DRM system. Of course, the system 10 can be implemented to include various combinations of protected and unprotected presentations 110 and 115; the illustrated embodiment shows examples of the diversity of presentation types contemplated by the invention.

In this embodiment, consumers 130A-B connect to the distributor 100 through the communications medium 150. Of course, in other embodiments fewer or greater numbers of consumers 130A-B can be present. In the illustrated embodiment, consumer 130A utilizes an MP3 player interface to access audio files, and consumer 130B utilizes the RealOne™ player by RealNetworks, Inc., of Seattle, Wash., U.S.A. Similarly to the providers 105A-B described above, other embodiments can include various combinations of applications that read the presentations 110 and 115, and the illustrated embodiment merely serves to show the diversity of reading/playing software platforms that consumers 130A-B can use to access presentations 110 and 115. In one embodiment, using dynamically-installed repackaging objects, a DRM computer 200 of the distributor 100 works with numerous combinations of presentation packaging and distribution technologies, including those received from providers 105A-B and those output to consumers 130A-B.

Figure 2:
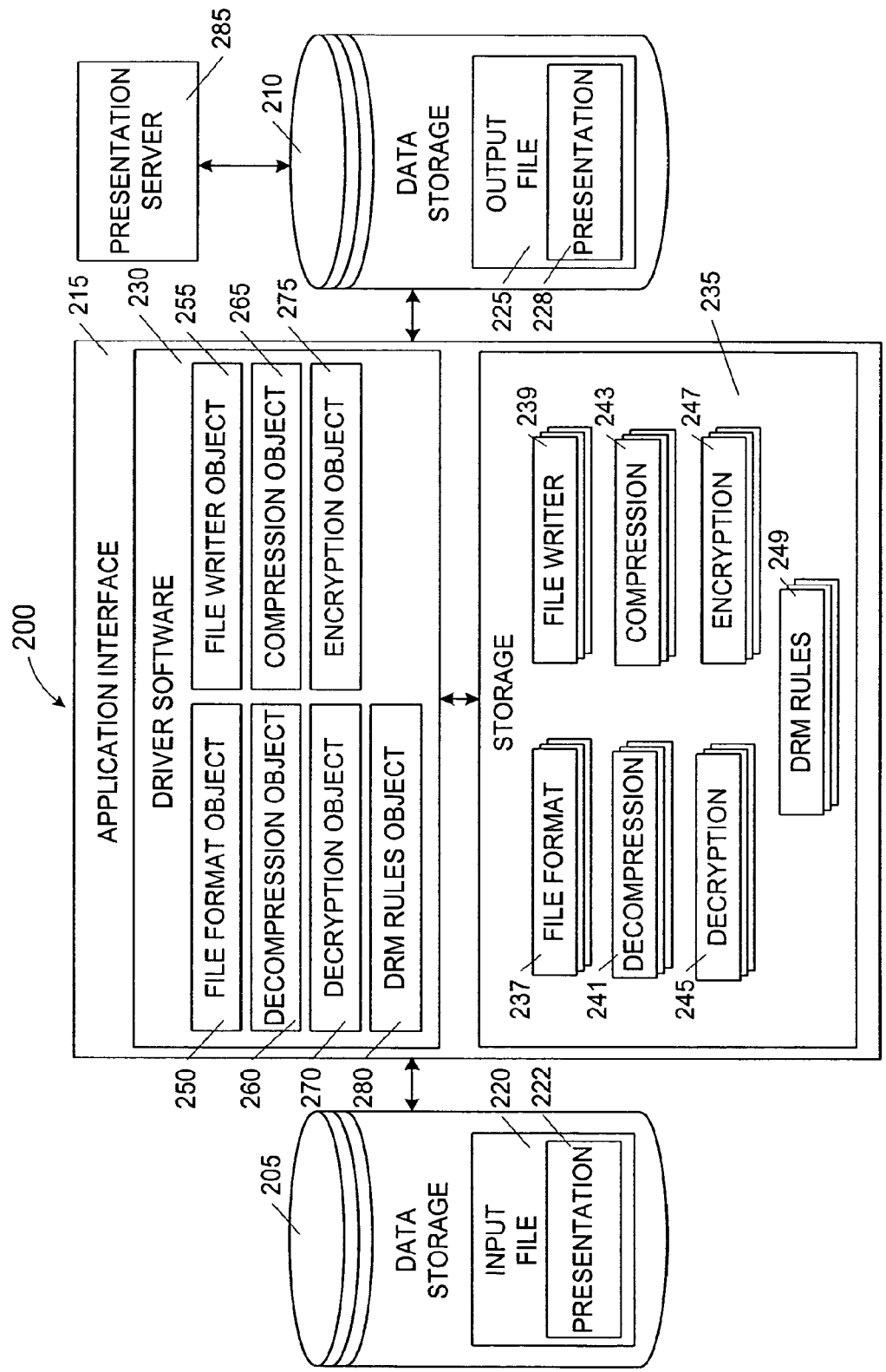
FIG. 2 is a block diagram illustrating one embodiment of a system comprising modules for repackaging content with a DRM system.

FIG. 2 is a block diagram depicting a DRM handler computer 200 containing modules to repackage, including adding or changing DRM systems, presentations 110-115. In effect, the computer 200 can provide interoperability of content packaged in a file format, compression technique, and/or DRM system that is different from the file format, compression technique, and/or DRM system that the reading/playing platforms consumers 130A-B use to access the presentations 110-115.

The computer 200 can include a conventional general purpose single- or multi-chip microprocessor, including but not limited to, a Pentium® processor, Pentium II® processor, Pentium III® processor, Pentium IV processor, Pentium® Pro processor, a 8051 processor, a MPS® processor, a Power PC® processor, or an ALPHA® processor. In addition, the microprocessor may be any conventional special purpose microprocessor such as a digital signal processor. While in one embodiment computer 200 comprises a traditional personal computer utilizing a screen and keyboard for interface with an operator, in another embodiment the computer 200 can be a single-purpose device configured specially for DRM system handling. In one embodiment, the computer 200 is a special-purpose device operated remotely over a network, e.g., the communications medium 150. In another embodiment, the computer 200 is pre-configured to perform the processes described here without operator intervention.

Additionally, in one embodiment the computer 200 can have data storage devices 205 and 210; however, in other embodiments the computer 200 has local or remote access to data storage devices 205 and 210, which can be located locally or remotely from the computer 200 rather than being part of the computer 200. For example, in one embodiment, the data storage devices 205 and 210 are magnetic or optical storage devices, e.g., a hard disk or a read-only memory optical disc, incorporated into the computer 200. In yet another embodiment, the data storage devices 205 and 210 are remote file servers accessed over a computer network. In another embodiment the storage devices 205 and 210 comprise removable media, such as, but not limited to, floppy disks, compact discs, DVDs, Zip® disks, external hard drives, and USB or Firewire® removable storage. In yet another embodiment there is only one data storage device and devices 205 and 210 represent that same storage device. In one embodiment, data storage device 205 stores an input file 220 that contains an input presentation 222.

In one embodiment, the input file 220 comprises only the input presentation 222, with no additional data. In another embodiment, the input file 220 contains additional data. Additional data in the input file 220 can vary and can include, but is not limited to, artist, album, or film information, network addresses where more information can be obtained, lyrics, purchasing information or network addresses where a consumer 130A-B can purchase additional access rights. Data storage device 210 can store an output file 225, which contains an output presentation 228. In one embodiment, the output file 225 comprises only the output media presentation 228, with no additional data. In another embodiment, the output file 225 contains additional data. In one embodiment, the media presentations 222 and 228 constitute the same presentation; however, in various embodiments, the file type format, compression technique, and DRM system for input files 220 and 225 can vary across a wide variety of technologies, as will be described below.

Thus, the system 200 can take an input file 220 containing a presentation 222 and create an output file 225 which contains the same content, but which is protected with a DRM system and is optionally in a different file format type than the input file 220. Because the system 200 can be used to distribute presentations via the Internet, in one embodiment, the system 200 includes a presentation server 285, which is in communication with data storage device 210. In one embodiment, the server 285 is connected to the Internet and provides content, such at the output file 225, to consumers. In one embodiment, where there is only one storage device representing both devices 205 and 210, the server 285 is in communication with that storage device. In yet another embodiment, the server 285 communicates with computer 200, through which the server 285 is able to access presentations for consumer access. In another embodiment, there is no server 285 at all, and after processing, output file 225 is stored on data storage device 210 for later use.

FIG. 2 also illustrates, in one embodiment, software modules stored or executing on computer 200. The software modules described here may be written in any programming language such as C, C–H–, BASIC, Pascal, Java, and Fortran and executed by any well-known operating system. C, C++, BASIC, Pascal, Java, and Fortran are industry standard programming languages for which commercial compilers can be used to create executable code. In one embodiment the computer 200 contains an application interface 215 that allows configuration and execution of the software modules by an operator. In one embodiment, the application interface 215 provides a console interface to an operator physically present with the computer 200. In another embodiment the interface 215 allows an operator to control the software modules of the computer 200 over a network connection, e.g., remotely via the communications medium 150 of FIG. 1.

In one embodiment, the driver module 230 performs the methods described below with respect to FIGS. 3, 4, and 5. In another embodiment, the driver module 230 may be partitioned into multiple modules. In the illustrated embodiment the computer 200 also contains storage 235 that stores various software object class libraries 237-249. In another embodiment, the storage 235 is external to computer 200; in yet another embodiment, the storage 235 is one of data storage devices 205 and 210. Storage 235 stores software object class libraries 237-249, which the driver 230 reads and uses to create particular instantiations of software objects. In one embodiment, the various object class libraries 237-249 provide a modular solution to the problems created by multiple file format types, compression techniques, and DRM systems. Because in one embodiment the various classes can be installed and updated without requiring complicated modifications to the driver 230, the use of such object class libraries 237-249 provides flexibility as new content packaging, including file format types, compression techniques, and protection technologies, emerge. While the illustrated embodiment shows the storage 235 as storing the object class libraries 237-249, in another embodiment the random-access memory of computer 200 stores the libraries 237-249. In one embodiment, individual object classes can be stored separately and are not associated with each other as libraries.

In one embodiment the computer 200 stores a file format type object library 237 ("format library 237") and a file writer object library 239 ("writer library 239"), each of libraries 237 and 239 comprising at least one class from which the driver 230 can instantiate a software object. In one embodiment, the file format type classes 237 describe software objects which can read and parse files of a particular format or set of formats and output data. By contrast, in one embodiment the writer classes 239 describe software objects which take data as input and output files in particular file format types. In one embodiment, particular file format type objects described by classes from the library 237 are configured to parse content files and output entire presentations; in another embodiment, particular file format type objects from the library 237 output multiple packets of data. Similarly, in one embodiment, particular file writer objects described by classes of the library 239 create files after receiving entire presentations; in another embodiment, particular file writer objects output individual packets of data into output files.

Generally, the term "format" refers to a specific arrangement or organization of data. Typically, the application that creates the data stores or distributes it in a format that the application establishes; the data usually must be read by the same or a similar program that can interpret the format. As used here, a "file format type" refers to a file type such as Audio Interchange File Format (ATP), AU sound file (AU), Standard MIDI file (MIDI), Sound Blaster sound file (VOC), WAVE audio file (WAV), bitmap files (BMP), Encapsulated PostScript file (EPS, EPSF), Graphics Interchange Format (GIF), PICT file (PIC), Tagged Image File Format (TIF, T114-4), Audio Video Interleave move file (AVI), Apple QuickTime movie file (MOV, MOOV, QT), Motion Picture Experts Group movie file (MPG), Microsoft Word file (DOC), etc.

In one embodiment the computer 200 stores a decompression object library 241 and a compression object library 243, each of libraries 241 and 243 comprising at least one class from which the driver 230 can instantiate a software object. In one embodiment the decompression classes 241 describe software objects which can decompress compressed data. In another embodiment, the decompression classes 241 describe software objects which can decompress compressed digital content to create analog data. By contrast, in one embodiment the compression classes 243 describe software objects which can compress digital data so that it may be compactly written to a file. In another embodiment, the compression classes 243 describe software objects which can compress analog data. Compression techniques include, but are not limited to, those used for audio and video compression in the RealMedia®, Windows Media®, MPEG, or QuickTime® formats.

Similarly to the file format types above, in one embodiment the classes in the compression library 243 and decompression library 241 describe objects which manipulate data at a packet level. As used here, a "packet" refers to a portion of the whole of a data file. In one embodiment, the separation of file-based and compression-based objects is desirable because some file format types support more than one compression technique. For example, the AVI audio/video file format type supports a number of different video compression techniques, including, for example MPEG-4 and H.263. As described above, to support files using these techniques, file classes supporting AVI can be created, along with compression classes supporting both MPEG-4 and H.263. In another embodiment, the file-based and compression-based objects are combined, and different classes are made for combinations of file format types and compression techniques. However the use of separate classes for file format types and compression techniques increases the ease of scalability of the system 10.

In one embodiment the computer 200 stores a DRM decryption object library 245 and a DRM encryption object library 247, each of libraries 245 and 247 comprising at least one class from which the driver 230 can instantiate a software object. In one embodiment the decryption classes 245 describe software objects that can decrypt data encrypted according to a particular DRM system. By contrast, the encryption classes 247 describe software objects which can encrypt data according to the techniques and rules of a particular DRM system. In the illustrated embodiment, these object classes are separated from the file format type and compression objects because many DRM systems, such as the system provided by RealNetworks, are configured to encrypt content data packaged in different file formats and compression techniques. For example, an object class in library 247 can use the Data Encryption Standard (commonly known as 'DES"), which is a 56-bit key, symmetric-key encryption method standardized by ANSI as ANSI X.3.92. Generally, encryption refers to the translation of data to a format that is unintelligible without a deciphering mechanism. Typically, to read encrypted data, the reading device must have access to a key or password that enables decryption of the data. Decryption refers to the process of decoding encrypted data. Decryption requires a key or password. The term "key" refers to a password or table needed to decipher encoded data.

In one embodiment, the computer 200 includes a DRM rules library 249, which comprises at least one class that defines presentation access rules for a particular DRM system. The objects created by the rules classes 249 can provide a general access structure that may have to be interpreted for an input presentation governed by a particular DRM system, and they provide the rules that are applicable to an output protected presentation.

As mentioned above, the use of libraries comprised of classes allows the driver 230 to create software objects when it determines that the system 200 needs the objects, and then to create the specific objects needed. Thus, the driver 230 can include a file format object 250, a file writer object 255, a decompression object 260, a compression object 265, a decryption object 270, an encryption object 275, and a DRM system rules object 280. In one embodiment, the driver 230 creates these objects during execution as it determines that they are needed. In another embodiment, the driver 230 does not instantiate every illustrated object. For example, if there is no need to manipulate data with regard to its method of compression, then the driver 230 does not create compression object 265 and decompression object 260. The objects 250-280 can be associated directly with the driver 230 and distinct from each other in their instantiation. In another embodiment, the objects 250-280 are separated entirely from the driver 230. In yet another embodiment, the storage 235 stores the objects 250-280. In yet another embodiment, the objects 250-280 are combined into fewer software objects while retaining the functionality illustrated. In one embodiment, the software objects 250-280 interface with the driver 230 through pre-determined interfaces which remain the same for every class in a library. As an example, in one embodiment a FileFormat object implements at least the following functions: Open( ) GetFileHeader( ) GetStreamHeader( ) GetPacket( ) Seek( ) and Close( ) For clarity, in the following discussions each of the libraries 237-249 and each of the software objects 250-280 are referred to individually.

Figure 3:
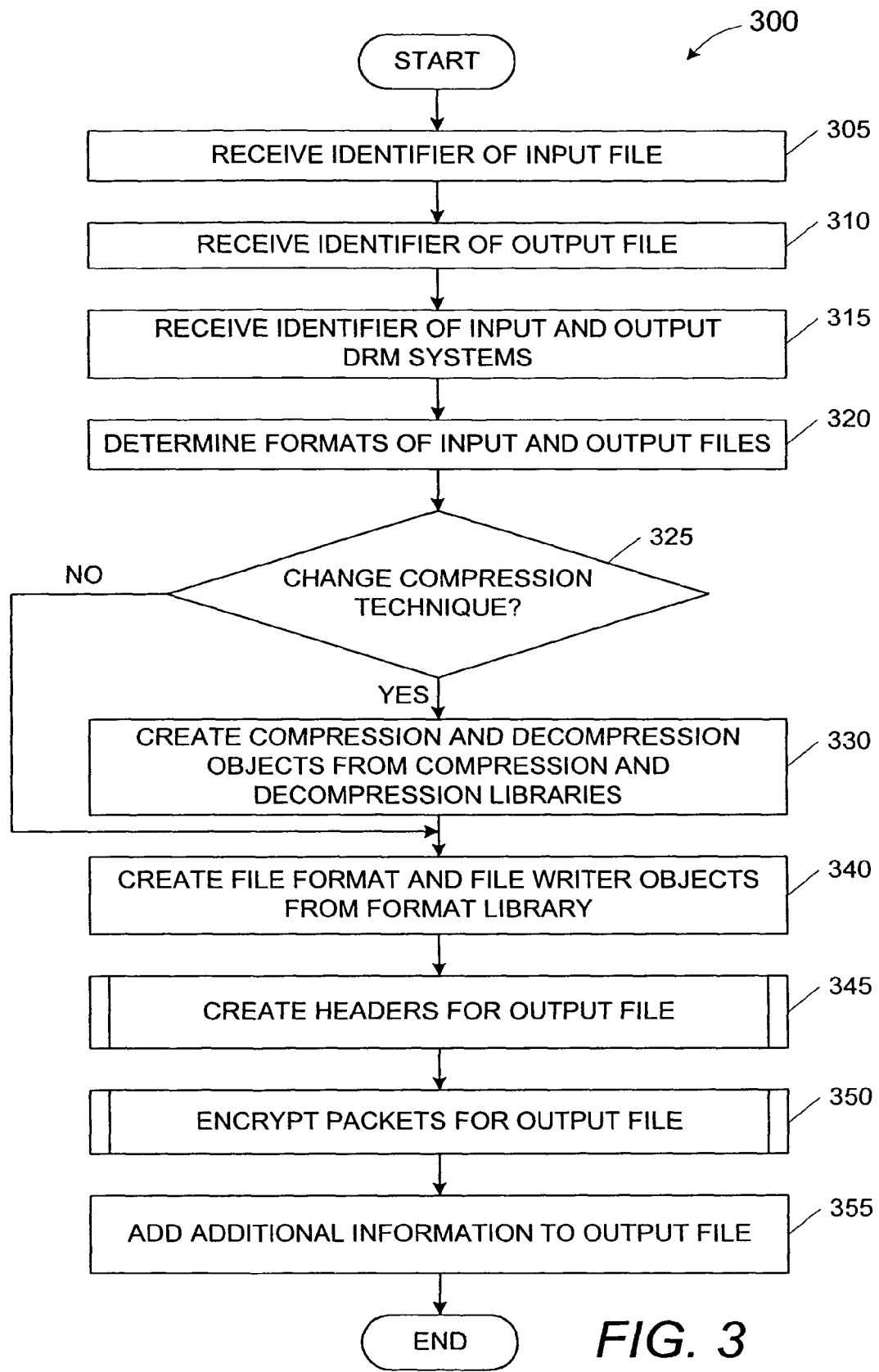
FIG. 3 is a flowchart illustrating an exemplary process of protecting a content file using a DRM system.

The flowchart of FIG. 3 illustrates an exemplary process that the system 200 can use to accept an input file 220 containing a presentation 222, process the presentation 222, and output a file 225 containing a presentation 227 that is a protected version of the presentation 222. Depending on the embodiment, steps may be added, removed, or merged, and the sequence of the steps rearranged. Starting at a step 305, the driver 230 receives an identifier of the input file 220. In one embodiment, the driver 230 receives an indicator of the location of the input file 220 on the storage device 205. In another embodiment, the driver 230 receives a network address where it can access the input file 220. In yet another embodiment, the driver 230 receives the entire input file 220. Continuing to a step 310, the driver 230 receives an identifier of the output file 225. In one embodiment, this identifier includes a description of the file format type of the output file 225 to be written. In another embodiment, the identifier includes the name of the output file 225. In yet another embodiment, the output file 225 already exists, and the identifier comprises the location of the output file 225.

Next, in a step 315 the driver 230 receives an identifier of a DRM system used in the input file 220 and a DRM system to be used in the output file 225. Of course, the identifier for the DRM system used in the input file 220 may be different, and may originate from a different source, from the identifier for the DRM system to be used in the output file 225. In one embodiment, the driver 230 queries the file format object 250 to parse the input file 220 and determine which DRM system the input file 220 uses. In another embodiment, the driver 230 queries an operator of the system 200 for an identifier of the input DRM system. In yet another embodiment, the driver 230 determines that the input file 220 does not utilize a DRM system and indicates the lack of a DRM system. In one embodiment, neither the operator nor the consumer 130A-B selects a DRM system for the output file 225, and the computer 200 creates the output file 225 without DRM protection. In another embodiment, an operator of the driver 230 selects a DRM system from a set of pre-determined supported DRM systems. In yet another embodiment, the driver 230 is configured to always utilize the same DRM system for the output file 225. In yet another embodiment, step 315 includes importing classes into the DRM related libraries 245, 247, and 249 so that a previously-unsupported DRM system can be selected.

Following the receipt of a DRM system identifier, at a step 320 the driver 230 determines the file format type of the input file 220 and of the output file 225. In one embodiment the driver 230 performs the step 320 by mapping the file extensions (e.g., .wav, .au, .mov, .tiff, .doc, .rtf, etc.) of a file to a lookup table or database. In another embodiment, the driver 230 prompts the operator to select the format type from a pre-determined list. In one embodiment, the driver 230 filters the pre-determined list to include only format types that are compatible with the previously-received DRM system identifier associated with the output file 225. In yet another embodiment, the step 320 comprises importing classes into format libraries 237 and 239 in order that the driver 230 may support an additional format type. In one embodiment, the determination of format types comprises parsing the input file 220 and the output file 225 (if it exists) to determine the format types they utilize.

Next, at a decision step 325, the driver 230 determines whether to change the compression technique. In one embodiment, the driver 230 determines the compression technique that the input file 220 utilizes. In another embodiment, at the decision step 325 the driver 230 determines the compression techniques supported by the format type, identified in step 310, of the output file 225. In yet another embodiment, the application interface 215 presents to an operator a choice of compression techniques that the format type of the output file 225 supports, and the driver 230 determines whether the chosen output compression technique differs from the compression technique used in the input file 220. If changing the compression technique is required, at a step 330 the driver 230 creates compression and decompression software objects 265 and 260 to allow the change in compression technique. In one embodiment, the driver 230 creates the objects 265 and 260 from classes found in the compression library 243 and the decompression library 241.

The process 300 continues to a step 340, where the driver 230 creates the format type 250 object and the file writer object 255 from classes contained in libraries 237 and 239, respectively. In one embodiment, the driver 230 chooses the format type classes determined in step 320 from the libraries 237 and 239. Next, at a step 345, the driver 230 creates headers for the output file 225. An exemplary process for executing step 345 will described in greater detail below with reference to FIG. 3. The process 300 continues to a step 350 where the software driver 230 encrypts content packets from input file 220 according to a DRM system. An illustrative process for performing the step 350 will described in greater detail below with reference to FIG. 5. Proceeding to a step 355, the driver 230 includes any additional information in the output file 225. In one embodiment, this additional information includes data received directly from the input file 220. In yet another embodiment, an operator of the application interface 215 inputs the additional information.

Figure 4:
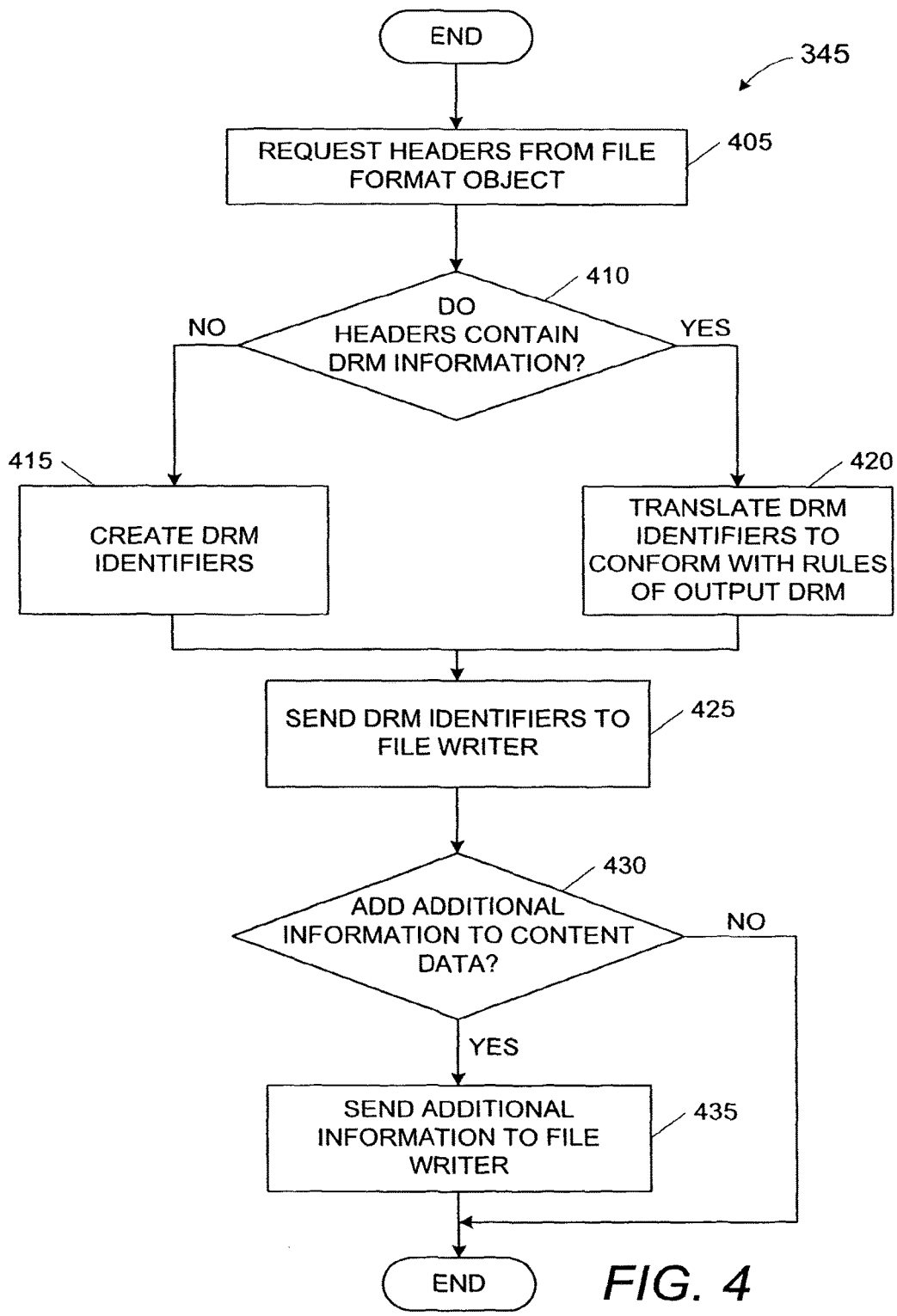
FIG. 4 is a flowchart illustrating an exemplary process of creating headers for content packaged according to a DRM system.

FIG. 4 depicts an exemplary process 345 which the system 200 can use to create headers for an output file 225. Depending on the embodiment, steps may be added, removed, or merged, and/or the sequence of the steps rearranged. Starting at a step 405 of the process 345, the driver 230 requests DRM headers from the format object 250, which parses the input file 220 to determine the information in the header. In another embodiment, the header of the input file 220 contains encrypted information relating to the DRM system used. In such an embodiment, the driver 230 creates the decryption object 270 and requests the DRM system information from the decryption object 270. Hence, the driver 230 obtains the header information after the decryption object 270 decrypts and parses the encrypted presentation 222. In one embodiment, the format object 250 still parses some header information from the input file 220; in another embodiment, the driver 230 acquires only the header information that the decryption object 270 parses.

Proceeding to a decision step 410 of the process 345, the driver 230 determines whether the parsed headers contain the DRM system information. Examples of this information include data describing encryption technique, types of access allowed to the presentation 222, amount of access (e.g., the number of times a file may be burned to a CD or copied to a hard drive), and where and how a consumer can purchase additional access. In one embodiment, these identifiers take the form of a DRM license. In one embodiment, the operator of the driver 230 can create content that is protected by a DRM system; hence, the decision step 410 and the following steps provide that the output file 225 contains the proper DRM system headers. In another embodiment, the output file 225 is not governed by a DRM system, and thus the driver 230 does not need to check the headers for the DRM system information.

If the driver 230 does not find the DRM system identifiers, at a step 415 the driver 230 creates new DRM system identifiers in compliance with the DRM system to be used in the output file 225, which may have been identified in step 315 of FIG. 2. In one embodiment the driver 230 obtains the parameters of the DRM identifiers by querying the consumer 130A-B for parameters. In another embodiment, the driver 230 retains default values such that every file the driver 230 processes can have a similar set of access rights associated with it. If, at step 410, the driver 230 determines that the headers of input file 220 contain the DRM system information, then at a step 420, the driver 230 translates the DRM system identifiers to conform to the rules of the DRM system associated with the output file 225. In one embodiment, at the step 420 the driver 230 access a matrix that provides a mapping of the access rules of one DRM system to another DRM system. In another embodiment, the driver 230 performs the action of step 420 by mapping the rules and allowed uses described in the input file 220 into a neutral language and then translating the neutral rules and uses into rules and a license that conforms to the DRM system to be used in the output file 225. In one embodiment, the driver 230 generates DRM rules for the output file 225 by instantiating a rules object 280. In yet another embodiment, the encryption and decryption objects 275 and 270, rather than the driver 230, perform the mapping. Next, at a step 425, the driver 230 sends the created or mapped DRM system identifiers to the file writer 255, which uses them to write the output file 225. In one embodiment, if the output file 225 did not previously exist and this is the first time it is being written to, the file writer 255 creates the output file 225 at this point. In another embodiment, the driver 230 creates the output file 225 at the time the file writer 255 is instantiated.

The process continues to a decision step 430, where in one embodiment the driver 230 determines whether an operator of the application interface 215 will add additional data to the output file 225. As mentioned above, such additional data may include, but is not limited to, information about the media content, purchasing information, network locations, or other multimedia content. In one embodiment, at the step 430 the driver 230 queries the operator for additional information. In another embodiment, the system 200 stores and indicates any additional information before the start of the process 345, and the driver 230 locates it at this time. In yet another embodiment, the driver 230 does not add additional information to the output file 225 at this time, but rather it adds the additional data after content is written to the output file 225. If the operator does not add information, the process ends. If, however, the operator adds information, at a step 435, the driver 230 receives the information and adds it to the output file 225 by sending it to the file writer 255.

Figure 5:
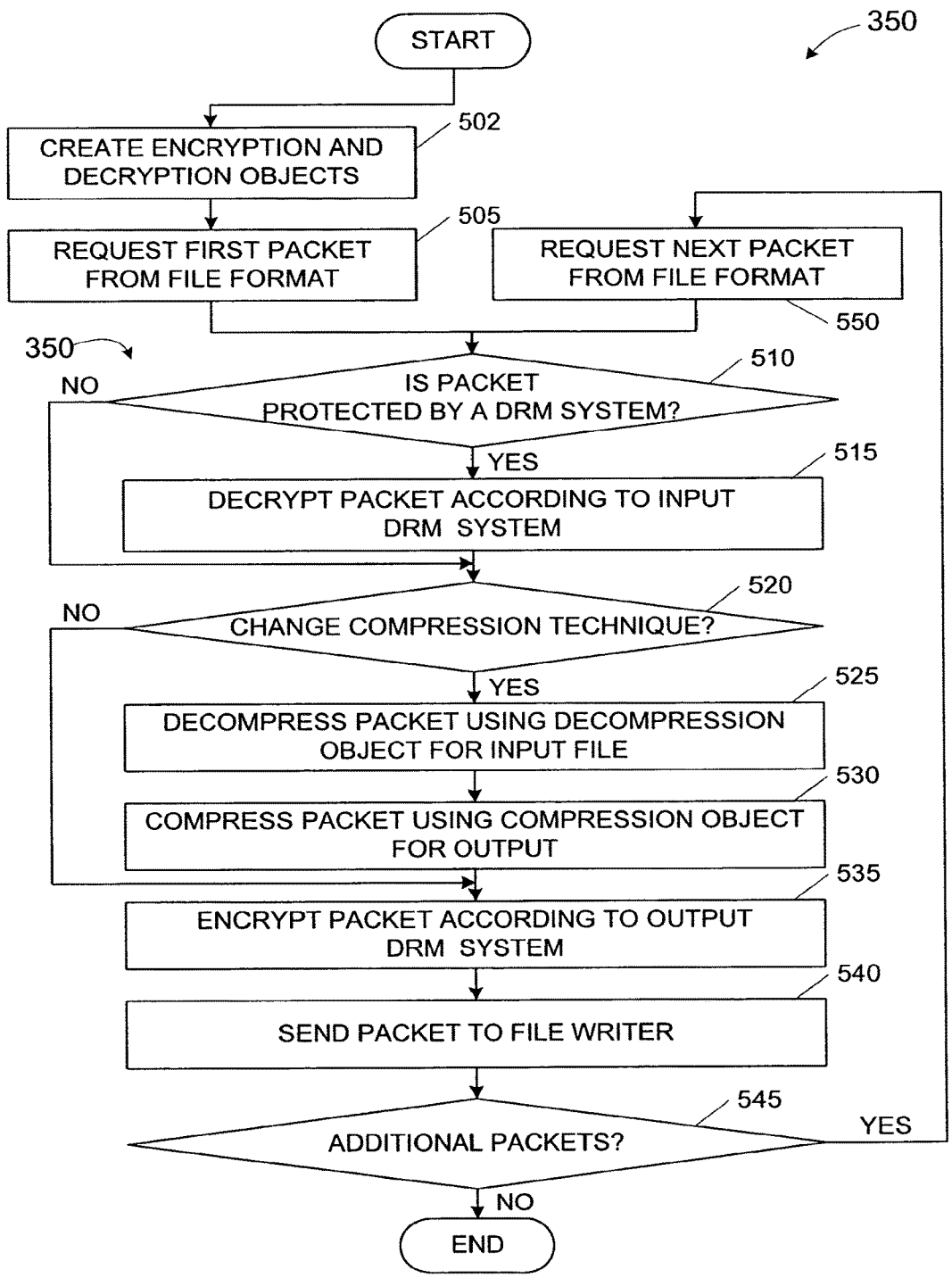
FIG. 5 is a flowchart illustrating an exemplary process of encoding content packets according to selected file type format and DRM system.

FIG. 5 shows an exemplary process 350 that the system 200 can use to encrypt and send content to the output file 225. Depending on the embodiment, steps may be added, removed, or merged, and the sequence of the steps rearranged. Starting at a step 502, the driver 230 creates encryption and decryption objects 275 and 270. In one embodiment, the decryption object 270 corresponds to the format of the input DRM system determined in step 315, and the driver 230 creates the decryption object 270 from a class in decryption library 245. In another embodiment, the input file 220 does not utilize a DRM system, and hence, the driver 230 does not create a decryption object 270. In one embodiment, the encryption object 275 corresponds to the DRM system to be used in the output file 225 and determined in step 315, and the driver 230 creates the encryption object 275 from a class in the encryption library 247.

Next, at a step 505, the driver 230 requests and receives a content packet from the format object 250. In one embodiment, the driver 230 performs this action by requesting that the format object 250 parse data from the input file 220. In another embodiment, the format object 250 sends data to the driver 230 in multiple-packet chunks; in another embodiment, the format object 250 sends the entirety of the content. The process 350 continues to a decision step 510 where the driver 230 determines if a DRM system protects the packet. In one embodiment, the driver 230 does this by checking the identifier of the DRM system used in the input file 220, which may have been received in step 315. In another embodiment, the driver 230 determines this itself by parsing the packet. If the packet is protected, at a step 515 the driver 230 decrypts the packet according to the DRM system used in the input file 220. In one embodiment, the driver 230 performs this task by sending the packet to the decryption object 270 created in step 502. At this point, whether decryption of the packet is performed or not, a packet of unprotected content exists.

The process 350 continues to a decision step 520, where the driver 230 determines whether to change the compression technique between the input presentation 222 and the output presentation 228. In one embodiment, the driver 230 bases this determination on the similar determination made in step 325. In another embodiment, the driver 230 performs the determination of step 325, or one similar, again. If the driver 230 determines that the compression technique is to change, at a step 525 the decompression object 214 decompresses the packet created in step 330, which packet is associated with the compression technique used by the input file 220. Proceeding to a step a 530, the compression object 243 recompresses the packet that was created in step 330, which packet is now associated with the compression technique chosen for the output file 228. If the driver 230 determines at decision step 520 that no change in compression technique is necessary, the driver 230 omits the steps 525 and 530.

Next, with the packet having the appropriate compression technique, the process continues to a step 535, where the driver 230 encrypts the packet according to the chosen DRM system. In one embodiment, the driver 230 performs the step 535 by sending the unencrypted packet to the encryption object 275 and receiving an encrypted version of the packet in return. The driver 230 sends the packet, in a step 540, to the writer object 255 for writing to the output file 225. At a decision step 545, the driver 230 determines whether there are additional packets for encryption. If so, the process 350 proceeds to a step 550, where the driver 230 requests the next packet from the format object 250, and the process 350 repeats from this point. If there are no additional packets, the process 350 ends.

The systems and methods described above provide for a robust and scalable system where any file, irrespective of format type, compression technique, or DRM system used, containing a presentation can be reformatted to have the appropriate format type, compression technique, or DRM system compatible with the hardware/software platform of a consumer 130A-B. Moreover, the systems and methods provide support for new format types, compression techniques, and DRM systems to be added conveniently and without requiring extensive software or hardware modification.

While the above detailed description has shown, described, and pointed out features of the invention as applied to various embodiments, it should be understood that various omissions, substitutions, and changes in the form and details of the devices or processes described may be made by those skilled in the art without departing from the spirit of the invention. The scope of the invention is indicated by the appended claims rather than by the foregoing description. All changes which come within the meaning and range of equivalency of the claims are to be embraced within their scope.

The invention claimed is:

1. One or more non-transitory computer readable storage media storing computer-executable instructions that when executed by a hardware processor of a computer platform result in the platform being capable of performing operations comprising:
   receiving by the computer platform, from a remote server of a content distributor via an Internet network, digital rights management (DRM) controlled video content, the DRM controlled video content being in accordance with a DRM technique, the DRM controlled video content being based, at least in part, upon certain video content that has been transcoded by a remote computer system via a selectable installable transcoding module, the certain video content having been received by the remote computer system, prior to being transcoded, from a handheld computing device, wherein the selected transcoding module is capable of generating transcoded certain video content in accordance with DRM rules determined, at least in part, by the remote server, and wherein the transcoded certain video content comprises an output file containing encrypted and/or compressed data.

2. The one or more computer readable storage media of claim 1, wherein:
   the DRM technique limits a number of times that the DRM controlled video content can be copied.

3. The one or more computer readable storage media of claim 1, wherein:
   the certain video content is to be stored, at least in part, in another remote server.

4. The one or more computer readable storage media of claim 1, wherein:
   the certain video content is to be transcoded from an Apple QuickTime format.

5. The one or more computer readable storage media of claim 1, wherein: as received by the remote computer system, the certain video content also is compressed.

6. The one or more computer readable storage media of claim 1, wherein:
   the DRM technique comprises at least one of:
      encryption; and
      watermarking.

7. The one or more computer readable storage media of claim 1, wherein:
   the certain video content is to be received by the remote computer system from the handheld computing device via a communications medium.

8. The one or more computer readable storage media of claim 1, wherein:
   the certain video content, as the certain video content is to be received by the remote computer system from the handheld computing device, has a certain format that corresponds to a certain format type; and the remote computer system is to transcode, at least in part, the certain video content by processing the certain video content to produce other video content having another format that corresponds to another format type that is different from the certain format type.

9. The one or more computer readable storage media of claim 8, wherein:

the another format type supports multiple different video compression techniques; and the certain format type corresponds to an Apple Quicktime movie format.

10. The one or more computer readable storage media of claim 9, wherein:

the another format type comprises Audio Video Interleave format type; and the multiple different video compression techniques comprise MPEG-4 and H.263 techniques.

11. A computer-implemented system comprising:

a computer platform comprising a hardware processor and software, the software when executed by the hardware processor of the computer platform resulting in the computer platform being capable of performing operations comprising:

receiving by the computer platform, from a remote server of a content distributor via an Internet network, digital rights management (DRM) controlled video content, the DRM controlled video content being in accordance with a DRM technique, the DRM controlled video content being based, at least in part, upon certain video content that has been transcoded by a remote computer system via a selectable installable transcoding modules, the certain video content having been received by the remote computer system, prior to being transcoded, from a handheld computing device, wherein the selected transcoding module is capable of generating transcoded certain video content in accordance with DRM rules determined, at least in part, by the remote server, and wherein the transcoded certain video content comprises an output file containing encrypted and/or compressed data.

12. The computer-implemented system of claim 11, wherein:

the DRM technique limits a number of times that the DRM controlled video content can be copied.

13. The computer-implemented system of claim 11, wherein:

the certain video content is to be stored, at least in part, in another remote server.

14. The computer-implemented system of claim 11, wherein:

the certain video content is to be transcoded from an Apple QuickTime format.

15. The computer-implemented system of claim 11, wherein: as received by the remmote computer system, the certain video content also is compressed.

16. The computer-implemented system of claim 11, wherein:

the DRM technique comprises at least one of:
encryption; and
watermarking.

17. The computer-implemented system of claim 11, wherein:

the certain video content is to be received by the remote computer system from the handheld computing device via a communications medium.

18. The computer-implemented system of claim 11, wherein:

the certain video content, as the certain video content is to be received by the remote computer system from the handheld computing device, has a certain format that corresponds to a certain format type; and the remote computer system is to transcode, at least in part, the certain video content by processing the certain video content to produce other video content having another format that corresponds to another format type that is different from the certain format type.

19. The computer-implemented system of claim 18, wherein:

the another format type supports multiple different video compression techniques; and the certain format type corresponds to an Apple Quicktime movie format.

20. The computer-implemented system of claim 19, wherein:

the another format type comprises Audio Video Interleave format type; and the multiple different video compression techniques comprise MPEG-4 and H.263 techniques.

* * * * *